US011722549B2

(12) United States Patent
Zhao et al.

(10) Patent No.: US 11,722,549 B2
(45) Date of Patent: Aug. 8, 2023

(54) METHOD AND APPARATUS OF COAP SUPPORT FOR IOT STREAMING DEVICES IN A MEDIA SCENE DESCRIPTION SYSTEM

(71) Applicant: Tencent America LLC, Palo Alto, CA (US)

(72) Inventors: Shuai Zhao, Pleasanton, CA (US); Stephan Wenger, Hillsborough, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/499,561

(22) Filed: Oct. 12, 2021

(65) Prior Publication Data

US 2022/0345512 A1    Oct. 27, 2022

Related U.S. Application Data

(60) Provisional application No. 63/177,783, filed on Apr. 21, 2021.

(51) Int. Cl.
*H04L 67/02* (2022.01)
*H04L 67/56* (2022.01)

(52) U.S. Cl.
CPC .............. *H04L 67/02* (2013.01); *H04L 67/56* (2022.05)

(58) Field of Classification Search
CPC ................................ H04L 67/02; H04L 67/56
See application file for complete search history.

(56) References Cited

U.S. PATENT DOCUMENTS

| 2016/0094673 | A1* | 3/2016  | Savolainen | ............. | H04L 67/02 |
| | | | | | 709/202 |
| 2017/0325125 | A1* | 11/2017 | Novo Diaz  | ............. | H04L 69/24 |
| 2018/0198670 | A1* | 7/2018  | Salmela    | ............. | H04L 63/0876 |
| 2019/0075149 | A1* | 3/2019  | Lu         | ............. | H04L 65/4084 |
| 2019/0373472 | A1* | 12/2019 | Smith      | ............. | H04W 4/38 |
| 2020/0274849 | A1* | 8/2020  | Smith      | ............. | H04L 63/0421 |

OTHER PUBLICATIONS

International Search Report and Written Opinion dated Jan. 21, 2022 in PCT/US 21/55000, 10 pages.

\* cited by examiner

*Primary Examiner* — Gil H. Lee
(74) *Attorney, Agent, or Firm* — ArentFox Schiff LLP

(57) ABSTRACT

Aspects of the disclosure provide methods and apparatus for accessing a Constrained Application Protocol (CoAP) server in a media scene description system. A CoAP request can be sent, by a media access function (MAF) of processing circuitry implementing the media scene description system using an application programming interface (API), to the CoAP server to request a media resource. The MAF can be configured as a CoAP client or a Hypertext Transfer Protocol (HTTP)-CoAP proxy. A CoAP response can be received, by the MAF using the API, from the CoAP server. In an example, the CoAP response includes the requested media resource. In an embodiment, the MAF is compatible with both the CoAP request according to a CoAP communication protocol and a proxy request according to an HTTP communication protocol.

15 Claims, 12 Drawing Sheets

```
{
  "nodes": [ ~ 201
    { 
      "name": "nodeName" ~ 202
    }
  ],
  "scenes": [ ~ 203
    {
      "name": "sceneName", ~ 204
      "nodes": [ ~ 205
        0
      ]
    }
  ],
  "scene": 0 ~ 206
}
```

*FIG. 2*

```
{
"extensionsRequired":[      ~301
    "MPEG_media"            ~302
],
"extensionsUsed":[          ~303
    "MPEG_media"            ~304
]
}
```

*FIG. 3A*

```
{
   "extensions": {
      "MPEG_media": {
         media: [
            {
310            "name": "source 0",
               "renderingRate": 30.0,
               "timeOffset": 0.1,
311            "autoplay": "true",
312            "loop": "true",
               "controls": "false",
313            "alternatives": [
                  {
305               "mimeType": "application/dash+xml",
306               "uri": "manifest-1.mpd",
307               "tracks": [
                     {
308                  "track": "#480p_ID=1"
                     },
                     {
                        "track": "#720p_ID=2"
                     },
                     {
                        "track": "#1080p_ID=3"
                     },
                  ]
                  }
                  {
309               "mimeType": "application/dash+xml",
                  "uri": "manifest-2.mpd",
314               "tracks": [
                     {
                        "track": "#4K_ID=1"
                     },
                     {
                        "track": "#8K_ID=2"
                     },
                  ]
                  }
               ],
            ]
         ]
      }
   }
}
```

FIG. 3B

METHOD AND APPARATUS OF COAP SUPPORT FOR IOT STREAMING DEVICES IN A MEDIA SCENE DESCRIPTION SYSTEM

INCORPORATION BY REFERENCE

This disclosure claims the benefit of priority to U.S. Provisional Application No. 63/177,783, entitled "METHOD AND APPARATUS OF COAP SUPPORT FOR IOT STREAMING DEVICES IN SCENE DESCRIPTION", filed on Apr. 21, 2021, which is incorporated by reference herein in its entirety.

TECHNICAL FIELD

The present disclosure describes embodiments generally related to system design to support media objects using a 3D modeling syntax, implement media syntax to support various media codecs, containers, and formats, manage media storage and delivery methods through predefined programming interfaces, and provide media buffer control and rendering functions.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Constrained Application Protocol (CoAP) is an Internet application protocol for constrained devices. CoAP enables the constrained devices called "nodes" to communicate with the wider Internet using similar protocols. CoAP is designed for use between devices on the same constrained network (e.g., low-power, lossy networks), between devices and general nodes on the Internet, and between devices on different constrained networks joined by the Internet.

SUMMARY

Aspects of the disclosure provide a method and an apparatus for accessing a Constrained Application Protocol (CoAP) server in a media scene description system. The apparatus can include processing circuitry implementing the media scene description system. A CoAP request can be sent by a media access function (MAF) of the processing circuitry using an application programming interface (API) to the CoAP server to request a media resource. The MAF can be configured as a CoAP client or a Hypertext Transfer Protocol (HTTP)-CoAP proxy. In an embodiment, the MAF is compatible with both the CoAP request according to a CoAP communication protocol and a proxy request according to an HTTP communication protocol.

A CoAP response can be received by the MAF using the API from the CoAP server. The CoAP response can include the requested media resource.

In an embodiment, the received media resource can be processed by one of (i) a video decoder, (ii) an audio decoder, or (iii) a data compressor. The processed media resource can be rendered by a presentation engine.

In an embodiment, the MAF is configured as the HTTP-CoAP proxy, and the API is an HTTP-CoAP proxy API. In an example, an HTTP request can be mapped by the MAF from an HTTP client to the CoAP request using the HTTP-CoAP proxy API. In an example, the HTTP request is the proxy request. In an example, the CoAP response is mapped by the MAF from the CoAP server to an HTTP response using the HTTP-CoAP proxy API. The HTTP response can be sent to the HTTP client.

In an embodiment, the MAF is configured as the CoAP client, and the API is a CoAP client API.

In an embodiment, the MAF is further configured to use HTTP.

Aspects of the disclosure also provide non-transitory computer-readable mediums storing instructions which when executed by a computer cause the computer to perform the method for accessing a CoAP server in a media scene description system.

BRIEF DESCRIPTION OF THE DRAWINGS

Further features, the nature, and various advantages of the disclosed subject matter will be more apparent from the following detailed description and the accompanying drawings in which:

FIG. 2 is an example of glTF JavaScript Object Notation (JSON) format representation according to an embodiment of the disclosure.

FIGS. 3A-3B show examples of Moving Picture Experts Group (MPEG) glTF extension and timed media JSON representation according to embodiments of the disclosure.

DETAILED DESCRIPTION OF EMBODIMENTS

Figure 1:
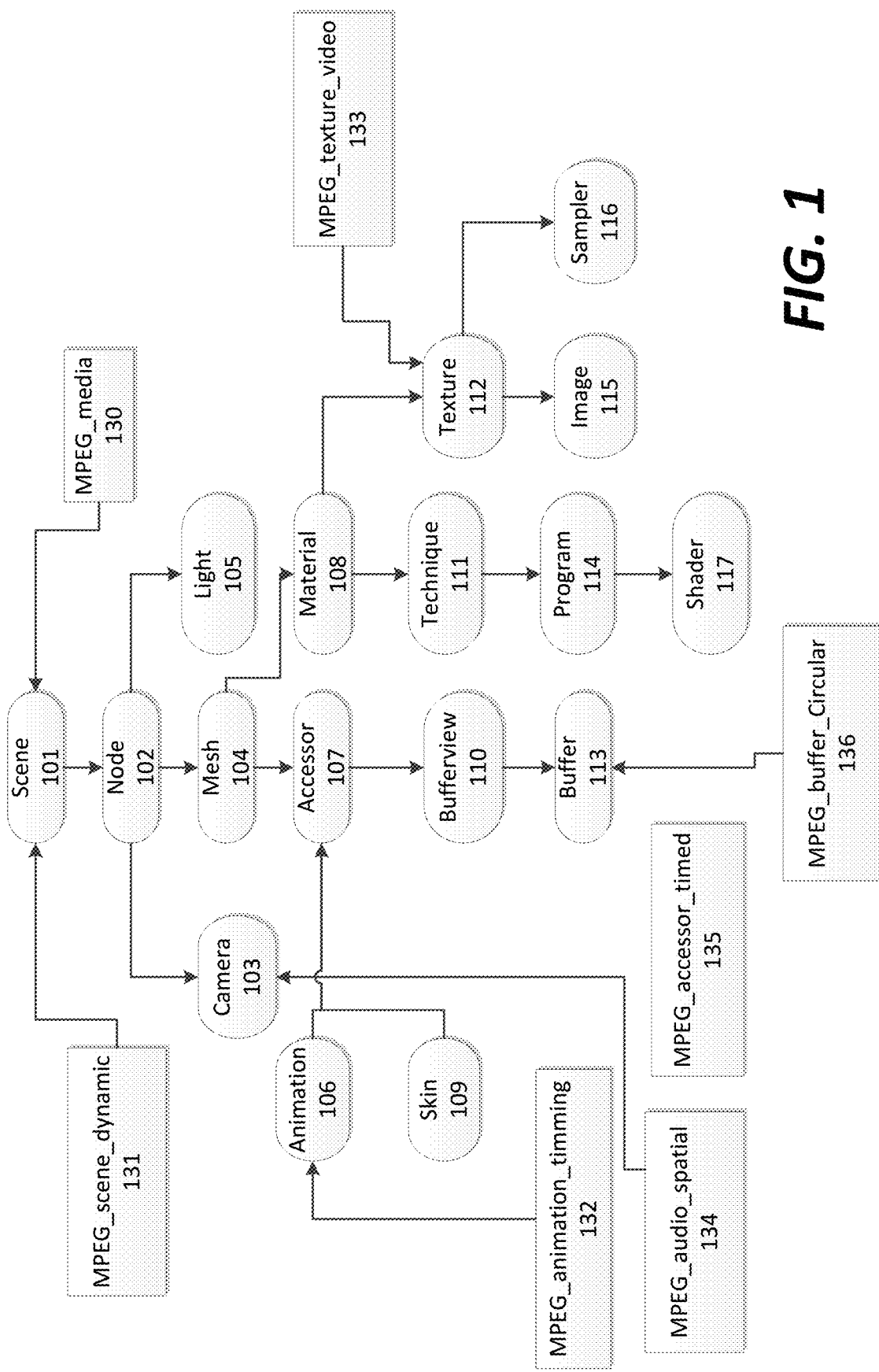
FIG. 1 is a schematic illustration of graphics language transmission format (glTF) scene description objects according to an embodiment of the disclosure.

FIG. 1 is a schematic illustration of graphics language transmission format (glTF) scene description objects according to an embodiment of the disclosure. The glTF is a standard file format for three-dimensional (3D) scenes and models. The glTF can support a 3D model geometry, appearance, scene graph hierarchy, and animation. The glTF is an application programming interface (API)-neutral runtime asset 3D modeling delivery format. In some embodiments, compared with traditional 3D modeling tools, the glTF can provide a more efficient, extensible, and interoperable format for the transmission and loading of 3D content. The glTF can be a streamlined and interoperable format for the delivery of 3D assets, while minimizing file size and runtime processing by apps.

A glTF file can use one of two file extensions including .gltf (i.e., JSON/ASCII) and .glb (i.e., binary). A .gltf file can be self-contained or may reference external binary and texture resources.

A glTF scene can be a combination of multiple glTF assets. The glTF assets can be JSON-formatted files containing a full scene description. Referring to FIG. 1, the full scene description can include a scene object (101), a node (102), a camera (103), a mesh (104), light (105), an animation (106), an accessor (107), material (108), skin (109), a bufferview (110), a technique (111), a texture (112), a buffer (113), a program (114), an image (115), a sampler (116), and a shader (117). The full scene description can also include supporting external data.

The glTF can support an external data source which may be referenced in any above-mentioned scene objects. In various examples, a binary file may be used for the animation (106) or other buffer-based data (113). An image file may be used for object textures (112).

FIG. 2 shows an example of glTF JavaScript Object Notation (JSON) format representation according to an embodiment of the disclosure. JSON is an open standard file format and a data interchange format that uses human-readable text to store and transmit data objects including attribute-value pairs and arrays (or other serializable values). JSON is a common data format with a diverse range of functionality in data interchange including communication of web applications with servers.

As described above, a glTF scene can be organized in the JSON format. The glTF asset can include zero or more scenes (203), e.g., a set of visual objects to render. Scenes can be defined in a scene array. FIG. 2 shows a single scene (206) (e.g., a scene 0) with a single node (201) (e.g., a node 0 (205)). Various parameters can be associated with each node object. A name (202) can specify a name of the node object. A scene name (204) can specify a name of the single scene (206).

The glTF scene assets can be consumed by a presentation engine for rendering a 3D or an immersive scene to users. In some examples, the glTF syntax only supports 3D objects including static or computer generated animations. In some examples, the glTF syntax does not support for media types such as video or audio, and does not render the video and/or audio media types. Certain glTF cannot describe a scene using geographical coordinate systems, describing a scene using geographical coordinate systems can be desired in some media presentation scenarios.

Therefore, there is a need to extend the glTF to support media types including 2D flat videos, immersive media content such as virtual reality (VR), augmented reality (AR), and/or extended reality (XR), and spatial audio. XR can refer to real-and-virtual combined environments and human-machine interactions generated by computer technology and wearables, where the 'X' can represent a variable for any suitable current or future spatial computing technologies. In an example, XR includes representative forms such as AR, mixed reality (MR), virtual reality (VR), and the areas interpolated among them. Thus, in some examples, an extension of the glTF to support video and/or audio syntax and a system for media deliveries and render is required.

In an embodiment, Moving Picture Experts Group (MPEG) defines certain extensions on top of glTF specification to support immersive media content. Referring to FIG. 1, the extensions can include MPEG_media (130), MPEG_scene_dynamic (131), MPEG animation timing (132), MPEG_texture_video (133), MPEG_audio_spatial (134), MPEG_accessor_timed (135), MPEG_buffer_circular (136), and/or the like.

In an example, if the MPEG_media (130) as a root identifier and if specified, then MPEG_media (130) can be supported. Referring to FIG. 3A, the syntax to support MPEG media can be declared as a top-level JSON syntax. In an example, syntax from 301 to 304 may be presented exactly as shown, if supported. The syntax from 301 to 304 can include extensionsRequired (301), MPEG_media (302), extensionsUsed (303), and MPEG_media (304).

Scene Updates can be expressed using the JSON patch protocol and MPEG_scene_dynamic (131) can be used to support the JSON patch protocol.

An MPEG texture video extension, identified by the MPEG_texture_video (133), can provide a possibility to link a glTF texture object to MPEG media and a respective track, listed by an MPEG_media object. The MPEG_texture_video extension can provide a reference to the MPEG_accessor_timed (135) where the decoded timed texture can be made available. The MPEG_audio_spatial (134) extension supports multiple audio types.

In order to support a timed data access, a buffer element can be extended to provide circular buffer functionality. The extension is named MPEG_buffer_circular (136) and can be included as part of the glTF "buffers" objects.

The MPEG extensions described above can allow for the creation of immersive experiences using the glTF. The glTF assets with the MPEG extensions can be loaded into a rendering engine for visualization.

FIG. 3B shows some examples of MPEG glTF extensions. In an example, a media type such as a Multipurpose Internet Mail Extensions (MIME) or MIME type is used. More specifically, a MIME type is indicated by application/dash+xml (305), and a Uniform Resource Identifier (URI) is indicated by manifest-1.mpd (306). Tracks (307) can be specified by (308). Another example is shown by (309) and (314). FIG. 3B also shows a name (310), an autoplay status (311), a loop status (312), and alternatives (313).

Figure 4:
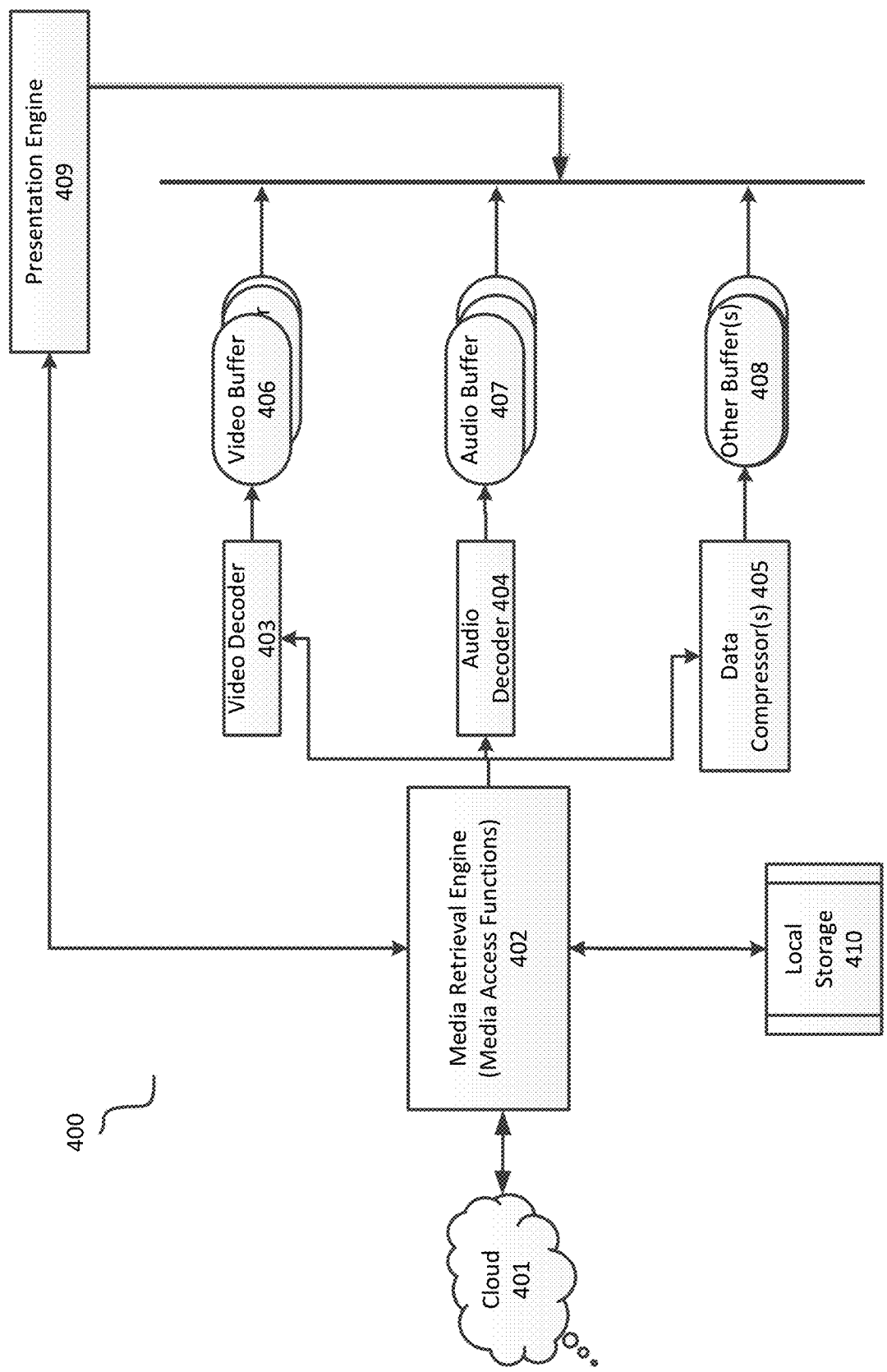
FIG. 4 shows an example of a media scene description system reference architecture according to an embodiment of the disclosure.

FIG. 4 is a schematic illustration of a media scene description system reference architecture (also referred to as a reference media scene description architecture) (400) according to an embodiment of the disclosure. The reference media scene description architecture (400) illustrates an example how MPEG extensions can be used to support various media types such as audio, video, and/or the like. Media content(s) (or media data) can be retrieved using a media retrieval engine (also referred to as a media access function (MAF)) (402) from an external source, such as a cloud or media cloud (401). The media content(s) can be processed, for example, by a video decoder (403), an audio decoder (404), or data compressor(s) (405). The processed media content(s) can be rendered by a presentation engine (409). The media data can be passed in a form of buffers (e.g., video buffers (406), audio buffers (407), other buffers (408), or the like) from the MAF (402) to a presentation engine (409). In some examples, the media content(s) are stored in a local storage (410).

Referring to FIG. 4, the MPEG scene description extensions are designed with a goal to decouple the presentation engine (409) from the MAF (402). The presentation engine (409) and the MAF (402) can communicate through predefined programming interfaces, and thus the presentation engine (409) can request the media data required for rendering the scene. The MAF (402) can retrieve the requested media data and make the media data available in a timely manner and in a format that can be processed by the presentation engine (409), for example, immediately. For example, a requested media asset (or media data) is compressed and is in a network, and the MAF (402) can retrieve the requested media asset. The requested media asset can be further decoded. The decoded media data can be passed to the presentation engine (409) for rendering. As described above, the media data can be passed in form of buffers (e.g., video buffers (406), audio buffers (407), other buffers (408), or the like) from the MAF (402) to the presentation engine (409). The requests for media data can be passed through a media retrieval API from the presentation engine (409) to the MAF (402). For flexible use of video decoding resource(s), the video decoding engine or the video decoder (403) can be used. When the video decoding engine (403) is used, the presentation engine (409) can provide information for input formatting and output formatting to the video decoder (403) through application configuration APIs.

The Constrained Application Protocol (CoAP) (also referred to the CoAP communication protocol), as described for example, in IETF RFC 7252, is a lightweight web transfer protocol as compared with Hypertext Transfer Protocol (HTTP). HTTP can also be referred to as the HTTP communication protocol. CoAP can be used for Internet of Things (IoT) devices which may have power, storage, and/or computing capacity limitations. In various embodiments, CoAP is a specialized web transfer protocol for use with constrained nodes and constrained (e.g., low-power, lossy) networks in the Internet of Things (IoT). The nodes can have 8-bit microcontrollers with small amounts of ROM and RAM, while the constrained networks such as IPv6 over Low-Power Wireless Personal Area Networks (6LoWPANs) can have relatively high packet error rates and a throughput of 10 s of kbit/s. CoAP can be designed for machine-to-machine (M2M) applications such as smart energy and building automation.

CoAP can have similar functionalities as HTTP, such as using a request/response mechanism and a client/server mode, and supporting RESTful APIs. A representational state transfer (REST) API (also known as RESTful API) is an API that conforms to the constraints of REST architectural style and allows for interaction with RESTful web services.

CoAP can use User Datagram Protocol (UDP) as an underlying transport protocol. CoAP can provide a request/response interaction model between application endpoints, can support built-in discovery of services and resources, and can include key concepts of the Web such as URIs and internet media types. CoAP can be designed to easily interface with HTTP for integration with the Web while meeting specialized requirements, such as multicast support, very low overhead, and simplicity for constrained environments.

In an embodiment, compared with traditional HTTP-based streaming solutions, CoAP has a lightweight protocol stack. CoAP can be easily deployed in low-power devices, such as ultra-low-power video streaming devices. CoAP can also support streaming protocols such as Dynamic Adaptive Streaming over HTTP (DASH), also known as MPEG-DASH, as well as data formats such as text, HTML, XML, JSON, and the like. MPEG-DASH is an adaptive bitrate streaming technique that enables high quality streaming of media content over the Internet delivered from conventional HTTP web servers.

One design of the glTF has considered IoT sensor data extensively and the glTF can have extensive interactions with the IoT sensor data such as enabling Web Graphics Library (WebGL) for rendering a geospatial data set of the IoT sensors on maps. WebGL is a JavaScript API for rendering interactive 2D and 3D graphics within any compatible web browser without the use of plug-ins.

As described above, when performing video streaming using an ultra-low-power device, a full-fledged HTTP implementation may not be possible in the ultra-low-power device. CoAP can be designed as a substituted web transfer protocol for IoT devices.

The support CoAP in MPEG-SD can be enabled in MAF, such as the MAF (402). By adding API support, media data, such as video data, can be fetched from an IoT device (e.g., a CoAP client) to a cloud and/or a local storage (e.g., a CoAP server) for rendering.

The glTF, for example, designed by the Khronos group, can enable a separation of the 3D data description text with binary data. The "URI" can specify a location of the binary data for media rendering and can support customized paths such as specified in glTF 2.0 specifications. For example, an implementation note indicates that clients can optionally support additional URI components, for example, HTTP:// or file:// schemes, authorities/hostnames, absolute paths, and query or fragment parameters. Assets containing the additional URI components may be less portable. For CoAP, the corresponding URI is coap://. CoAP has been implemented in many open-source flavors.

CoAP can be designed to act like a lightweight HTTP with GET/POST/PUT/DELETE methods, for example, as specified in Table 1 below (adapted from IETF RFC 7252).

TABLE 1

CoAP method codes

| Code | Name | Reference |
| --- | --- | --- |
| 0.01 | GET | [RFC7252] |
| 0.02 | POST | [RFC7252] |
| 0.03 | PUT | [RFC7252] |
| 0.04 | DELETE | [RFC7252] |

The GET method can retrieve a representation for the information that currently corresponds to the resource identified by the request URI. The POST method can request that the representation enclosed in the request be processed. The actual function performed by the POST method can be determined by the origin server and dependent on the target resource, for example, a new resource can be created or the target resource can be updated. The PUT method can request that the resource identified by the request URI be updated or created with the enclosed representation. The representation format can be specified by the media type and content coding given in the Content-Format Option, if provided. The DELETE method can request that the resource identified by the request URI be deleted.

Exemplary response codes can be defined as, for example, in IETF RFC 7252. The response codes can include a class of response code "Success 2.xx", a class of response code "Client Error 4.xx", and a class of response code "Server Error 5.xx" where "xx" represents two numbers. In an example, "xx" is in the range of 00 to 31. The class of response code "Success 2.xx" can indicate that the clients request was successfully received, understood, and accepted. The class of response code "Client Error 4.xx" can indicate cases in which the client seems to have erred. The class of response code "Server Error 5.xx" can indicate cases in which the server is aware that the server has erred or is incapable of performing the request. Table 2 shows examples of CoAP response codes according to an embodiment of the disclosure.

TABLE 2

Examples of CoAP response codes

| Code | Description | Reference |
|---|---|---|
| 2.01 | Created | [RFC7252] |
| 2.02 | Deleted | [RFC7252] |
| 2.03 | Valid | [RFC7252] |
| 2.04 | Changed | [RFC7252] |
| 2.05 | Content | [RFC7252] |
| 4.00 | Bad Request | [RFC7252] |
| 4.01 | Unauthorized | [RFC7252] |
| 4.02 | Bad Option | [RFC7252] |
| 4.03 | Forbidden | [RFC7252] |
| 4.04 | Not Found | [RFC7252] |
| 4.05 | Method Not Allowed | [RFC7252] |
| 4.06 | Not Acceptable | [RFC7252] |
| 4.12 | Precondition Failed | [RFC7252] |
| 4.13 | Request Entity Too Large | [RFC7252] |
| 4.15 | Unsupported Content-Format | [RFC7252] |
| 5.00 | Internal Server Error | [RFC7252] |
| 5.01 | Not Implemented | [RFC7252] |
| 5.02 | Bad Gateway | [RFC7252] |
| 5.03 | Service Unavailable | [RFC7252] |
| 5.04 | Gateway Timeout | [RFC7252] |
| 5.05 | Proxying Not Supported | [RFC7252] |

The CoAP support in both a CoAP Server and a CoAP Client can support the request/response methods. CoAP request and response semantics can be carried in CoAP messages, which include either a Method Code or Response Code, respectively. Optional (or default) request and response information, such as the URI and payload media type can be carried as CoAP options. A Token can be used to match responses to requests independently from the underlying messages. A request can be carried in a Confirmable (CON) or non-confirmable (NON) message, and, if immediately available, the response to a request carried in a Confirmable message can be carried in the resulting Acknowledgement (ACK) message. If the server is not able to respond immediately to a request carried in a Confirmable message, the serve can respond with an Empty Acknowledgement message so that the client can stop retransmitting the request. When the response is ready, the server can send the response in a new Confirmable message. If a request is sent in a non-confirmable message, then the response is sent using a new non-confirmable message, although the server may send a Confirmable message.

CoAP can use the URI schema: coap://host:port/path/to/resource to represent unsecured resources, as compared to HTTP.

CoAP can use the URI schema: coaps://host:port/path/to/resource to represent secured resources, as compared to Hypertext Transfer Protocol Secure (HTTPS) with Transport Layer Security (TLS).

The content format supported by CoAP, such as audio and/or video, can be specified in "application/media-type". Table 3 shows an exemplary list of supported media-type values (adapted from IETF RFC 7252) according to an embodiment of the disclosure. For video and/or audio content, the specific media type can be defined, for example, in IETF RFC 2046. For example, if CoAP is used for transporting video binary data, the content format is specified as "application/video" in RFC 2046.

TABLE 3

CoAP content-formats

| Media type | Encoding | ID | Reference |
|---|---|---|---|
| text/plain charset = utf-8 | — | 0 | [RFC2046] [RFC3676] [RFC5147] |
| application/link-format | — | 40 | [RFC6690] |
| application/xml | — | 41 | [RFC3023] |
| application/octet-stream | — | 42 | [RFC2045] [RFC2046] |
| application/exi | — | 47 | [REC-exi-20140211] |
| application/json | — | 50 | [RFC7159] |

Figure 5:
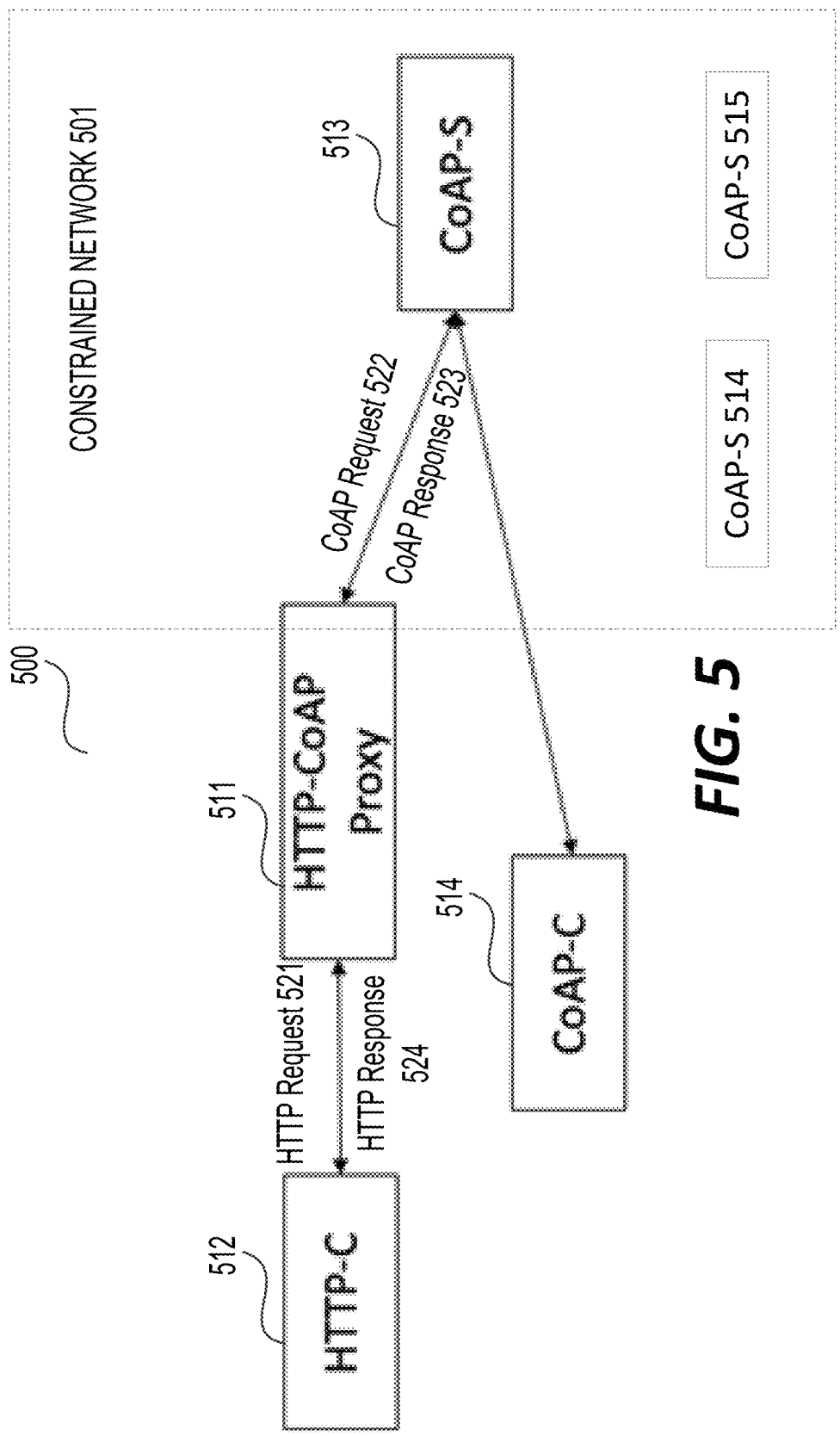
FIG. 5 is a schematic illustration of common Constrained Application Protocol (CoAP) deployment model according to an embodiment of the disclosure.

FIG. 5 shows an example of a CoAP deployment scenario (500), such as a common CoAP deployment scenario, according to an embodiment of the disclosure. CoAP and HTTP can be designed as web transport protocols with different use cases as described above. A cross-protocol network proxy (e.g., a HTTP-CoAP proxy or a HC proxy) (511) can be implemented to perform translation from HTTP to CoAP. Thus, an HTTP client (HTTP-C) (512) is enabled to access resources on a CoAP server (CoAP-S) (513) through the cross-protocol network proxy (511). Accordingly, an HTTP request is mapped to a CoAP request and a CoAP response is mapped back to an HTTP response.

Referring to FIG. 5, the CoAP-S (513) is in a constrained network (501). The constrained network (501) can include a plurality of CoAP servers, such as CoAP-S (513)-(515). In an embodiment, the HC Proxy (511) is located at a boundary of the constrained network domain (501). In an example, the HC Proxy (511) allows only a very specific type of traffic, such as authorized inbound HTTP requests (e.g., the HTTP request (521)) and associated outbound CoAP responses (e.g., the HTTP response (524)) to pass through. In an example, other kinds of traffic are segregated within the respective network segments.

As described above, the HTTP-CoAP proxy (511) can act as middleware between the HTTP-C (512) and the CoAP-S (513). The HTTP-CoAP proxy (511) can translate a request of the HTTP-C (512) and forward the request to the CoAP-S (513), for example, as specified in IETF RFC 8075. Further, the CoAP-S (513) can communicate with the CoAP-C (514) directly.

The HC Proxy (511) can be accessed by the HTTP-C (512) that needs to fetch a resource on the CoAP-S (513). The HC Proxy (511) can handle a HTTP request (521) from the HTTP-C (512) by mapping the HTTP request (521) to an equivalent CoAP request (522), and the equivalent CoAP request (522) is then forwarded to the CoAP-S (513). A CoAP response (523) from the CoAP-S (513) is then mapped to an appropriate HTTP response (524) and the appropriate HTTP response (524) is then sent back to the originating HTTP-C (512).

In various examples, to support IoT devices streaming video content in the CoAP deployment scenario (500), the MAF (402) has the capability to support CoAP protocols and to proxy HTTP requests and/or responses to and from the CoAP-S (513).

According to aspects of the disclosure, in support of CoAP in scene descriptions, one or more APIs can be used to enable an MAF (e.g., the MAF (402)) to support CoAP protocols and/or function as a HTTP to CoAP proxy (e.g., the HC Proxy (511)).

According to an embodiment of the disclosure, one or more APIs can be used to enable the MAF (e.g., the MAF (402)) to support the CoAP protocols. Referring to Table 4, an API (also referred to as an MAF API) can be applied to a case where the MAF (e.g., the MAF (402)) acts as a CoAP client (CoAP-C) to fetch media data (e.g., timed media, media resource, or the like) from a CoAP server (CoAP-S) (also referred to as a CoAP media server). The APIs in Table 4 are also referred to as CoAP APIs or CoAP Client APIs.

TABLE 4

Description of a CoAP Client (CoAP-C) API

| Method | Brief Description |
| --- | --- |
| fetch ( ) | An MAF sends a media resource request to a CoAP server |
| Receive ( ) | An MAF receives a requested media resource from a CoAP server |

Figure 6:
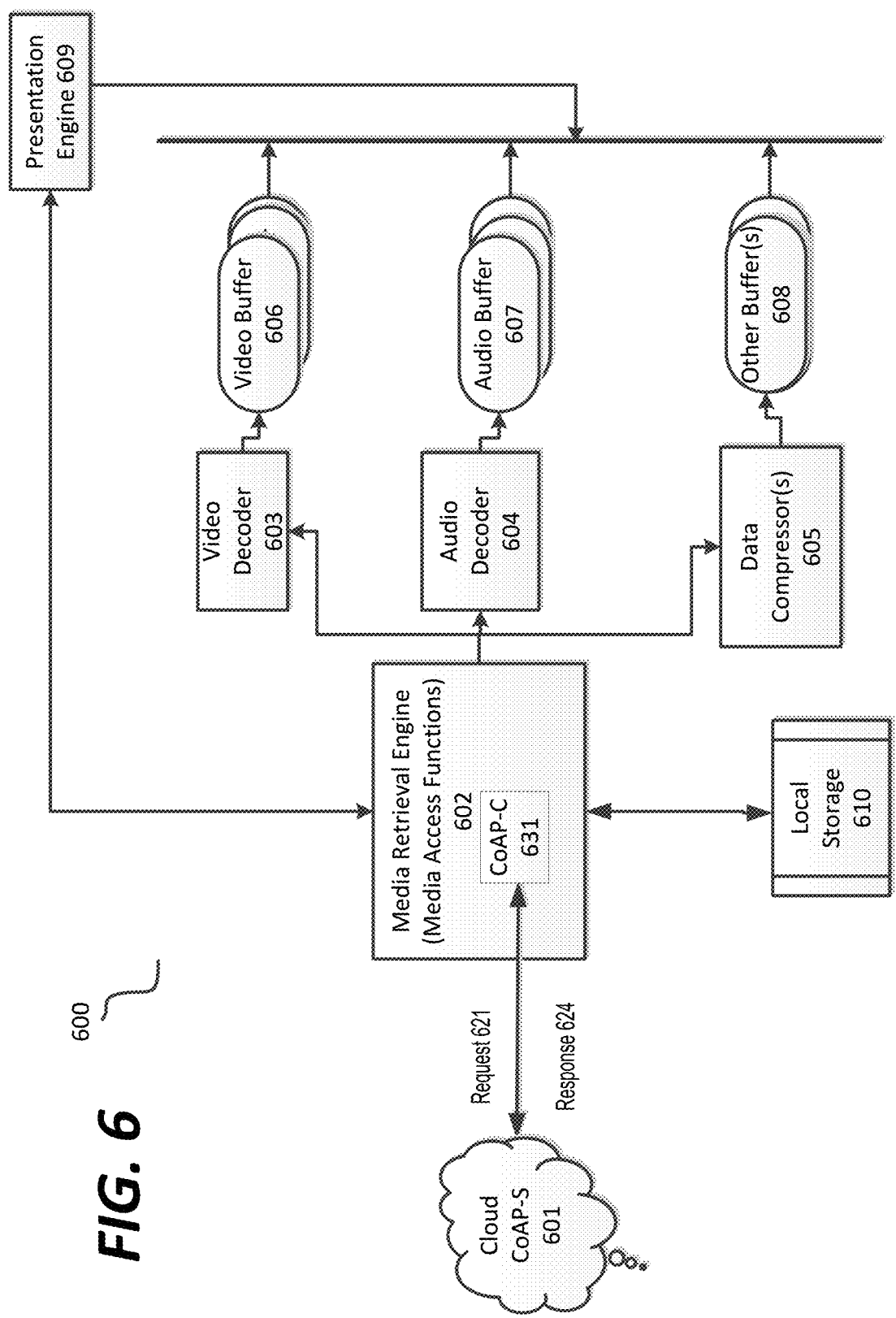
FIG. 6 shows an example of a media scene description system reference architecture according to an embodiment of the disclosure.

FIG. 6 shows an exemplary media scene description system reference architecture (or a reference media scene description architecture) (600) according to an embodiment of the disclosure. The reference media scene description architecture or the media scene description system (600) can include a CoAP-S (601), an MAF (602) as a CoAP-C (602), a video decoder (603), an audio decoder (604), data compressor(s) (605), a video buffer (606), an audio buffer (607), other buffer(s) (608), a presentation engine (609), a local storage (610), and/or the like.

Various components including the video decoder (603), the audio decoder (604), the data compressor(s) (605), the video buffer (606), the audio buffer (607), the other buffer(s) (608), the presentation engine (609), and the local storage (610) in the reference media scene description architecture (600) can be identical or similar to the video decoder (403), the audio decoder (404), the data compressor(s) (405), the video buffer (406), the audio buffer (407), the other buffer(s) (408), the presentation engine (409), and the local storage (410) in the reference media scene description architecture (400) shown in FIG. 4, respectively, and thus detailed descriptions are omitted for purposes of brevity.

Referring to FIG. 6, the MAF (602) or a media retrieval engine can act as the CoAP-C to fetch media data (e.g., timed media) from the CoAP-S (601). The CoAP-S (601) can be a cloud server. An API method (e.g., fetch 0) can be used for the MAF (602) to send a media resource request (or request) (621) to the CoAP-S (601). An API method (e.g., receive 0) can be used for the MAF (602) to receive a requested media resource (or resource) (624) from the CoAP-S (601). The requested media resource (or resource) (624) can be timed media from the CoAP-S (601). Subsequently, the resource (624) (e.g., media content(s)) can be processed, for example, by the video decoder (603), the audio decoder (604), or the data compressors (605). The processed resource (624) can be rendered by the presentation engine (609). The processed resource (624) (e.g., media data) can be passed in a form of buffers (e.g., the video buffers (606), the audio buffers (607), the other buffers (608), or the like) from the MAF (602) to the presentation engine (609). The resource (624) can be stored in the local storage (610).

The MAF or CoAP-C (602) can retrieve the requested media data and make the media data available in a timely manner and in a format that can be processed by the presentation engine (609), for example, immediately. The requests for media data can be passed through a media retrieval API from the presentation engine (609) to the MAF or CoAP-C (602). For flexible use of video decoding resource(s), the video decoding engine or the video decoder (603) can be used. When the video decoding engine (603) is used, the presentation engine (609) can provide information for input formatting and output formatting to the video decoder (603) through application configuration APIs.

FIG. 6 shows that using a CoAP-C API method (e.g., fetch( )), the MAF (602) acting as the CoAP-C can send the media resource request (621) to the CoAP-S (601) (e.g., a cloud server). Using a CoAP-C API method (e.g., receive ( )), the MAF (602) acting as the CoAP-C can receive the requested media resource from the CoAP-S (601).

According to an embodiment of the disclosure, one or more APIs can be used to enable the MAF (e.g., the MAF (402)) to act as a HC Proxy. Referring to Table 5, an API (also referred to as an MAF API or an HTTP-CoAP proxy API) can be applied to a case where the MAF (e.g., the MAF (402)) acts as an HC Proxy.

TABLE 5

Description of HTTP-CoAP proxy API

| Method | Brief Description |
| --- | --- |
| hc ( ) | An MAF maps HTTP request(s) to CoAP and forwards the HTTP request(s) to a CoAP Server |

Figure 7:
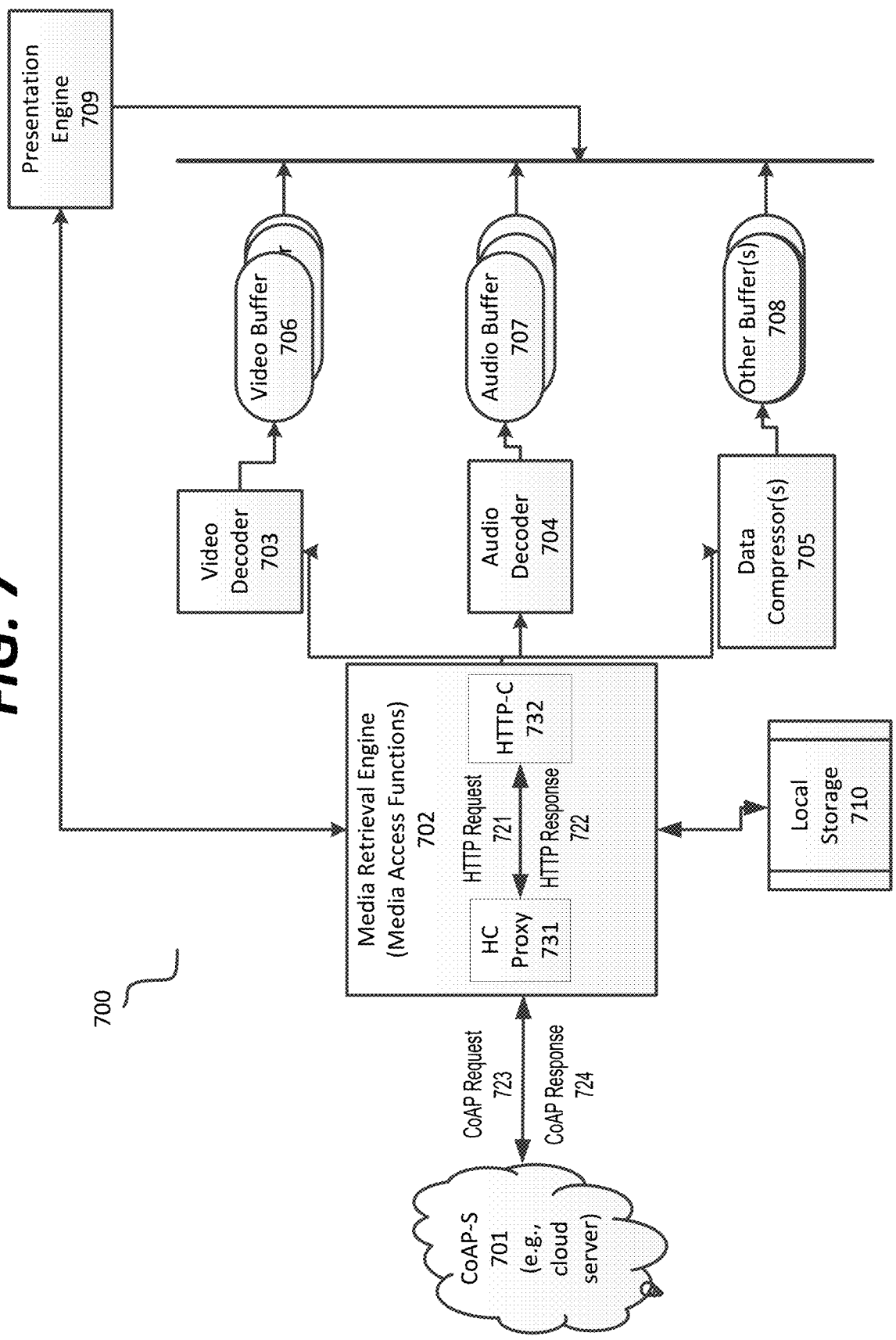
FIG. 7 shows an example of a media scene description system reference architecture according to an embodiment of the disclosure.

FIG. 7 shows an exemplary media scene description system reference architecture (or a reference media scene description architecture) (700) according to an embodiment of the disclosure. The reference media scene description architecture or the media scene description system (700) can include a CoAP-S (701), an MAF (702), a video decoder (703), an audio decoder (704), data compressor(s) (705), a video buffer (706), an audio buffer (707), other buffer(s) (708), a presentation engine (709), a local storage (710), and/or the like.

Various components including the video decoder (703), the audio decoder (704), the data compressor(s) (705), the video buffer (706), the audio buffer (707), the other buffer(s) (708), the presentation engine (709), and the local storage (710) in the reference media scene description architecture (700) can be identical or similar to the video decoder (403), the audio decoder (404), the data compressor(s) (405), the video buffer (406), the audio buffer (407), the other buffer(s) (408), the presentation engine (409), and the local storage (410) in the reference media scene description architecture (400) shown in FIG. 4, respectively, and thus detailed descriptions are omitted for purposes of brevity.

Referring to FIG. 7, the MAF (702) or a media retrieval engine can act as an HC Proxy (e.g., HC-Proxy (731)), and thus can map a HTTP request (721) from an HTTP-C (732) to a CoAP request (723) and can forward the CoAP request (723) to the CoAP-S (701) (e.g., a cloud server). An API (e.g., hc ( ) in Table 5) can be used for the MAF (702) to map the HTTP request (721) to the CoAP request (723) and forward the HTTP request (721) (as the CoAP request (723)) to the CoAP-S (701).

In an example, a CoAP response (724) from the CoAP-S (701) is mapped to an HTTP response (722) by the MAF (702) (e.g., the HC Proxy (731)) and the HTTP response (722) is then sent back to the HTTP-C (732). In an example, the HTTP response (722) (e.g., media data) can be processed, for example, by the video decoder (703), the audio decoder (704), or the data compressors (705), and can be further rendered by the presentation engine (709).

FIG. 7 shows that using the HC Proxy API (e.g., hc( ), the MAF (702) acting as the HC Proxy can map HTTP request(s) to CoAP and forward the HTTP request(s) to the CoAP-S (701). In an example shown in FIG. 7, the MAF (702) can function as the HC Proxy (731) and the HTTP-C (732).

Figure 8:
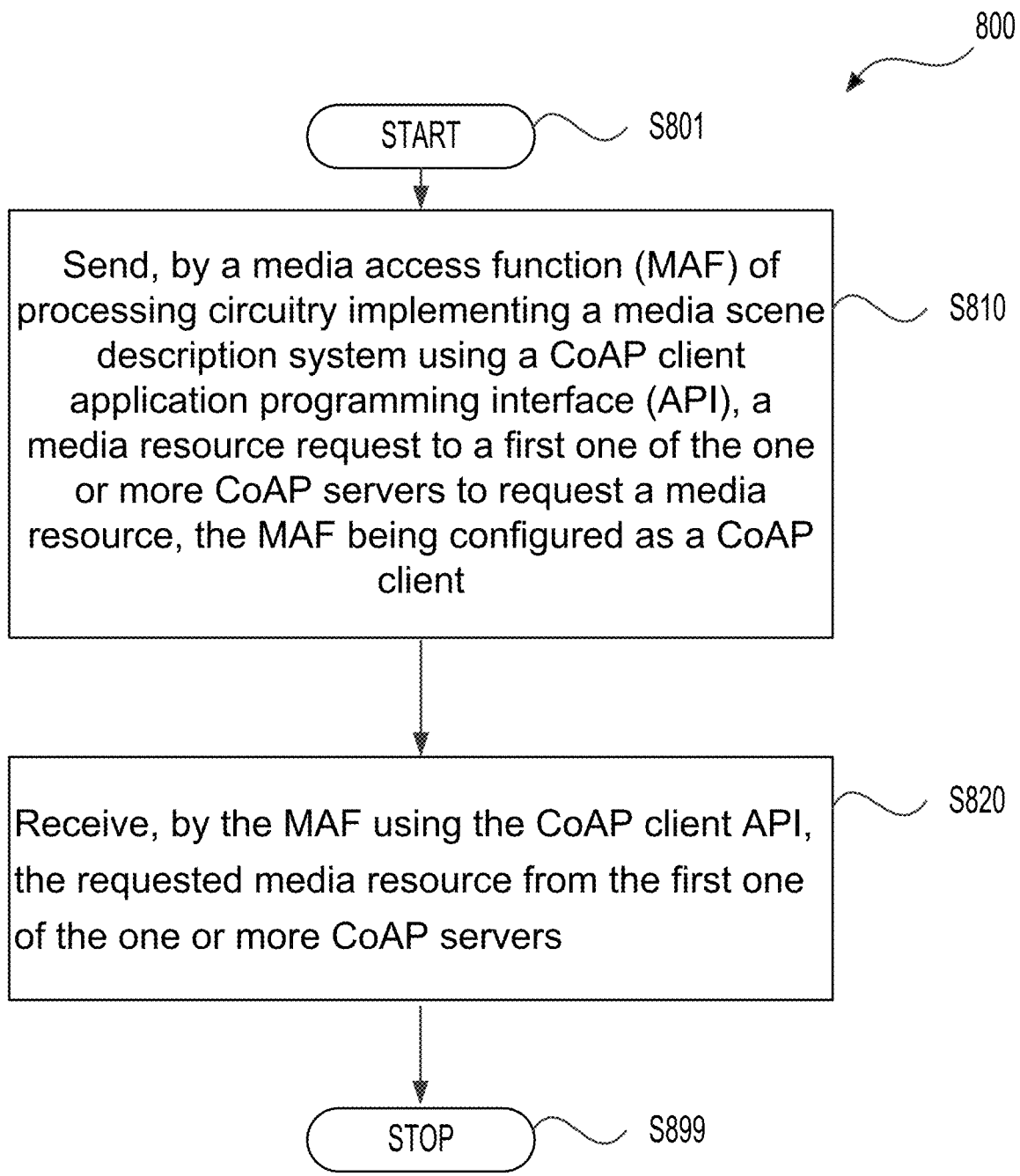
FIG. 8 shows a flow chart outlining a process (800) according to an embodiment of the disclosure.

FIG. 8 shows a flow chart outlining a process (800) according to an embodiment of the disclosure. The process (800) can be used where an MAF acts as a CoAP client to fetch timed media from a CoAP server. In various embodiments, the process (800) is executed by processing circuitry. In some embodiments, the process (800) is implemented in software instructions, thus when the processing circuitry executes the software instructions, the processing circuitry performs the process (800). The process starts at (S801) and proceeds to (S810).

At (S810), a media resource request can be sent to a CoAP server (e.g., (601)) to request a media resource using CoAP by an MAF (e.g., (602)) in a media scene description system using a CoAP client API, as described with reference to FIG. 6. The MAF (e.g., (602)) can be configured as a CoAP client. The MAF can be configured for a plurality of Internet protocols, such as the HTTP and the CoAP.

At (S820), the requested media resource can be received from the CoAP server (e.g., (601)) by the MAF (e.g., (602)) using the CoAP client API.

The process (800) can be suitably adapted. Step(s) in the process (800) can be modified and/or omitted. Additional step(s) can be added. Any suitable order of implementation can be used. In an example, the received media resource can be processed by one of (i) a video decoder (e.g., (603)), (ii) an audio decoder (e.g., (604)), or (iii) a data compressor (e.g., (605)). The processed media resource can be rendered by a presentation engine (e.g., (609)).

Figure 9:
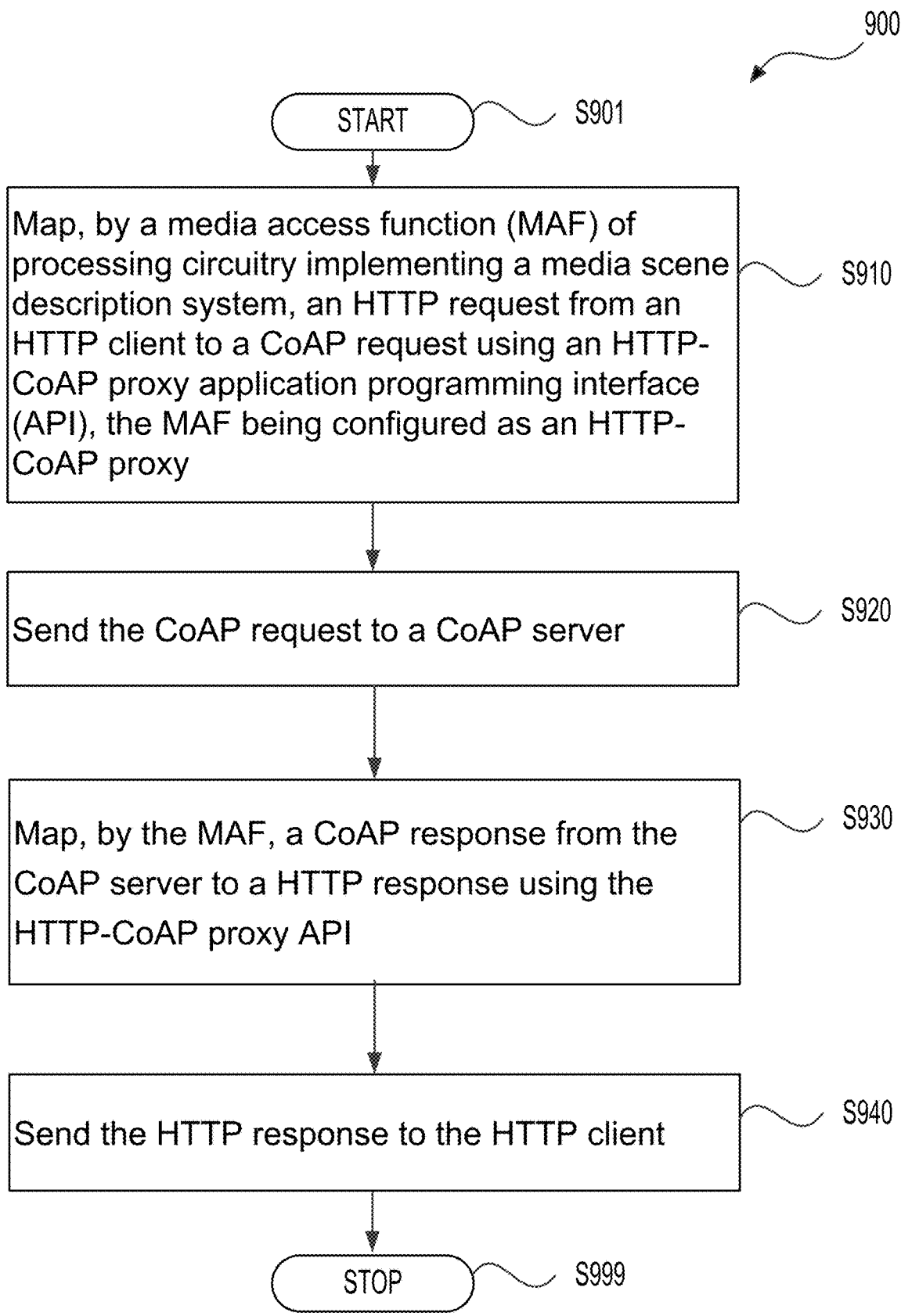
FIG. 9 shows a flow chart outlining a process (900) according to an embodiment of the disclosure.

FIG. 9 shows a flow chart outlining a process (900) according to an embodiment of the disclosure. The process (900) can be used where an MAF acts as a CoAP client to fetch timed media from a CoAP server. In various embodiments, the process (900) is executed by processing circuitry. In some embodiments, the process (900) is implemented in software instructions, thus when the processing circuitry executes the software instructions, the processing circuitry performs the process (900). The process starts at (S901) and proceeds to (S910).

At (S910), an HTTP request from an HTTP client can be mapped to a CoAP request using an HTTP-CoAP proxy application programming interface (API) in an MAF in a media scene description system, as described with reference to FIG. 7. The MAF can be configured as an HTTP-CoAP proxy. The MAF can be configured for a plurality of Internet protocols, such as the HTTP and the CoAP.

At (S920), the CoAP request can be sent to a CoAP server.

At (S930), a CoAP response from the CoAP server can be mapped by the MAF to an HTTP response using the HTTP-CoAP proxy API.

At (S940), the HTTP response can be sent to the HTTP client. The process (900) proceeds to (S999), and terminates.

The process (900) can be suitably adapted. Step(s) in the process (900) can be modified and/or omitted. Additional step(s) can be added. Any suitable order of implementation can be used. In an example, the HTTP response can be processed by one of (i) a video decoder (e.g., (703)), (ii) an audio decoder (e.g., (704)), or (iii) a data compressor (e.g., (705)). The processed HTTP response can be rendered by a presentation engine (e.g., (709)).

Figure 10:
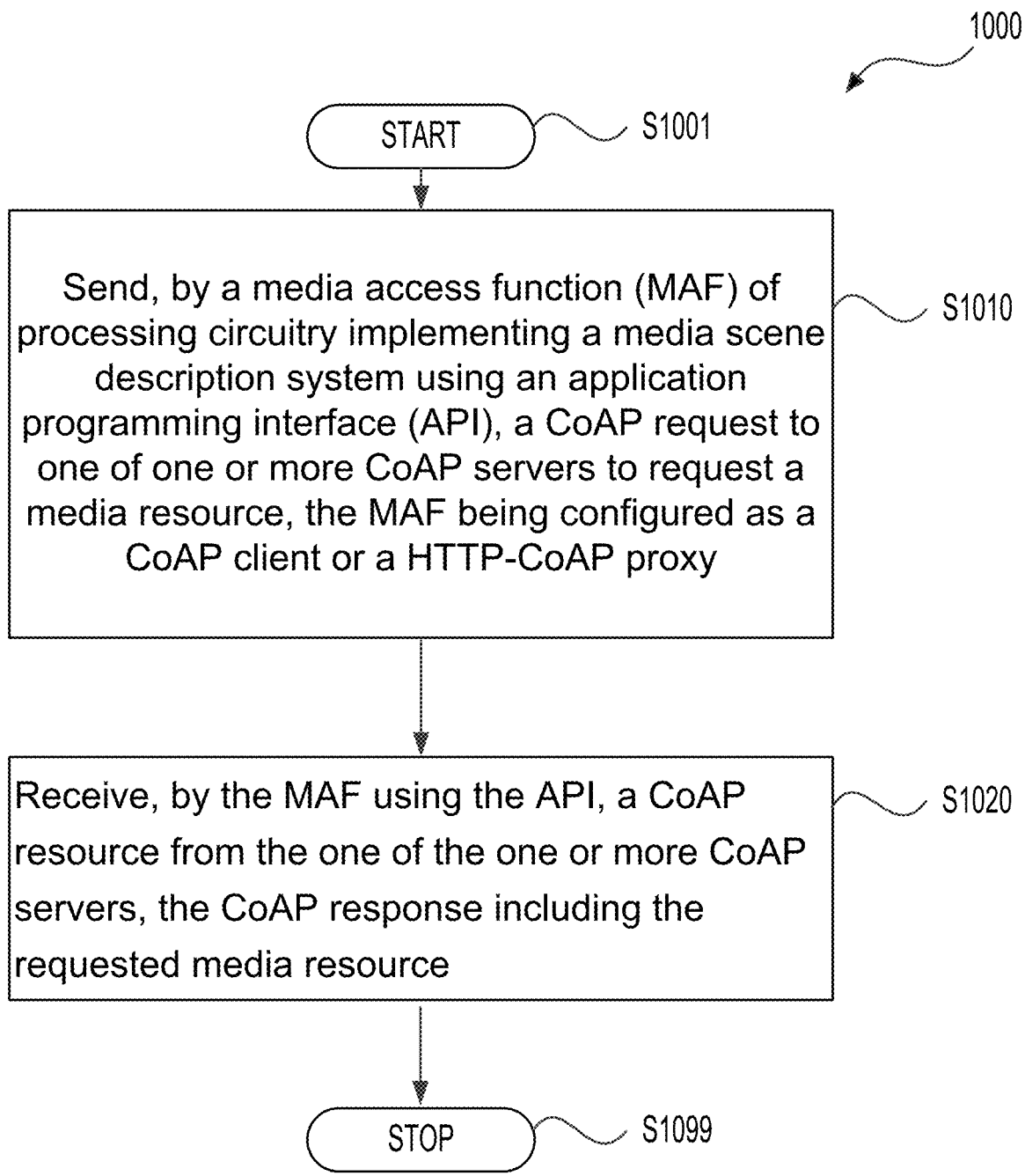
FIG. 10 shows a flow chart outlining a process (1000) according to an embodiment of the disclosure.

FIG. 10 shows a flow chart outlining a process (1000) according to an embodiment of the disclosure. The process (1000) can be used for accessing one or more CoAP servers in a media scene description system (e.g., (600) or (700)). The process (1000) can be used where an MAF acts as a CoAP client to fetch timed media from a CoAP server or the MAF acts as an HTTP-CoAP proxy. In various embodiments, the process (1000) is executed by processing circuitry. In some embodiments, the process (1000) is implemented in software instructions, thus when the processing circuitry executes the software instructions, the processing circuitry performs the process (1000). The process starts at (S1001) and proceeds to (S1010).

At (S1010), a CoAP request can be sent, for example, by an MAF of processing circuitry implementing the media scene description system using an API, to a CoAP server to request a media resource. The MAF can be configured as a CoAP client or an HTTP-CoAP proxy. In an example, the CoAP request is referred to as a media resource request, such as the request (621) or the CoAP request (723).

In an embodiment, the MAF is configured as the HTTP-CoAP proxy. The API is an HTTP-CoAP proxy API, as described in FIG. 7. The CoAP server can be the CoAP-S (701).

In an embodiment, the MAF is configured as the CoAP client. The API is a CoAP client API, as described in FIG. 6. The CoAP server can be the CoAP-S (601).

The MAF can be configured for a plurality of Internet protocols, such as HTTP and the CoAP. In an embodiment, the MAF is compatible with both the CoAP request according to a CoAP communication protocol and a proxy request according to an HTTP communication protocol.

At (S1020), a CoAP response can be received by the MAF using the API from the CoAP server. In an example, the CoAP response includes the requested media resource.

The process (1000) can be suitably adapted. Step(s) in the process (1000) can be modified and/or omitted. Additional step(s) can be added. Any suitable order of implementation can be used. In an example, the received media resource can be processed by one of (i) a video decoder (e.g., (603) or (703)), (ii) an audio decoder (e.g., (604) or (704)), or (iii) a data compressor (e.g., (605) or (705)). The processed media resource can be rendered by a presentation engine (e.g., (609) or (709)).

In an embodiment, the MAF is configured as the HTTP-CoAP proxy. Referring back to FIG. 7, the HTTP request can be mapped, by the MAF, from an HTTP client to the CoAP request using the HTTP-CoAP proxy API. In an example, the HTTP request is the proxy request. Further, the CoAP response can be mapped, by the MAF, from the CoAP server to an HTTP response using the HTTP-CoAP proxy API. The HTTP response can be sent to the HTTP client.

Embodiments in the disclosure may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

Methods described with references to FIGS. 6-10 can be combined in any suitable order. For example, one or more steps of FIG. 8 can be included in the process (900). One or more steps of FIG. 9 can be included in the process (800). In an example, the MAF described in FIGS. 6-10 can also be configured to communicate with a server (e.g., the cloud server (401)) using HTTP. Thus, an MAF in the disclosure can be configured to communicate with device(s) using HTTP. Further, with appropriate API(s), such as the CoAP client API, the HTTP-CoAP proxy API, and/or the like, the MAP can be configured to communicate with devices (e.g., IoT device(s)) using CoAP when the devices (e.g., IoT device(s)) are not configured to use HTTP due to certain limitations, such as power, storage, and/or computing capacity limitations. As shown in FIGS. 6-10, a CoAP-C and HTTP CoAP proxy can be deployed in an MAF, and thus with the appropriate API(s), the MAF can act as a CoAP-C, the HTTP CoAP proxy, or the like.

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
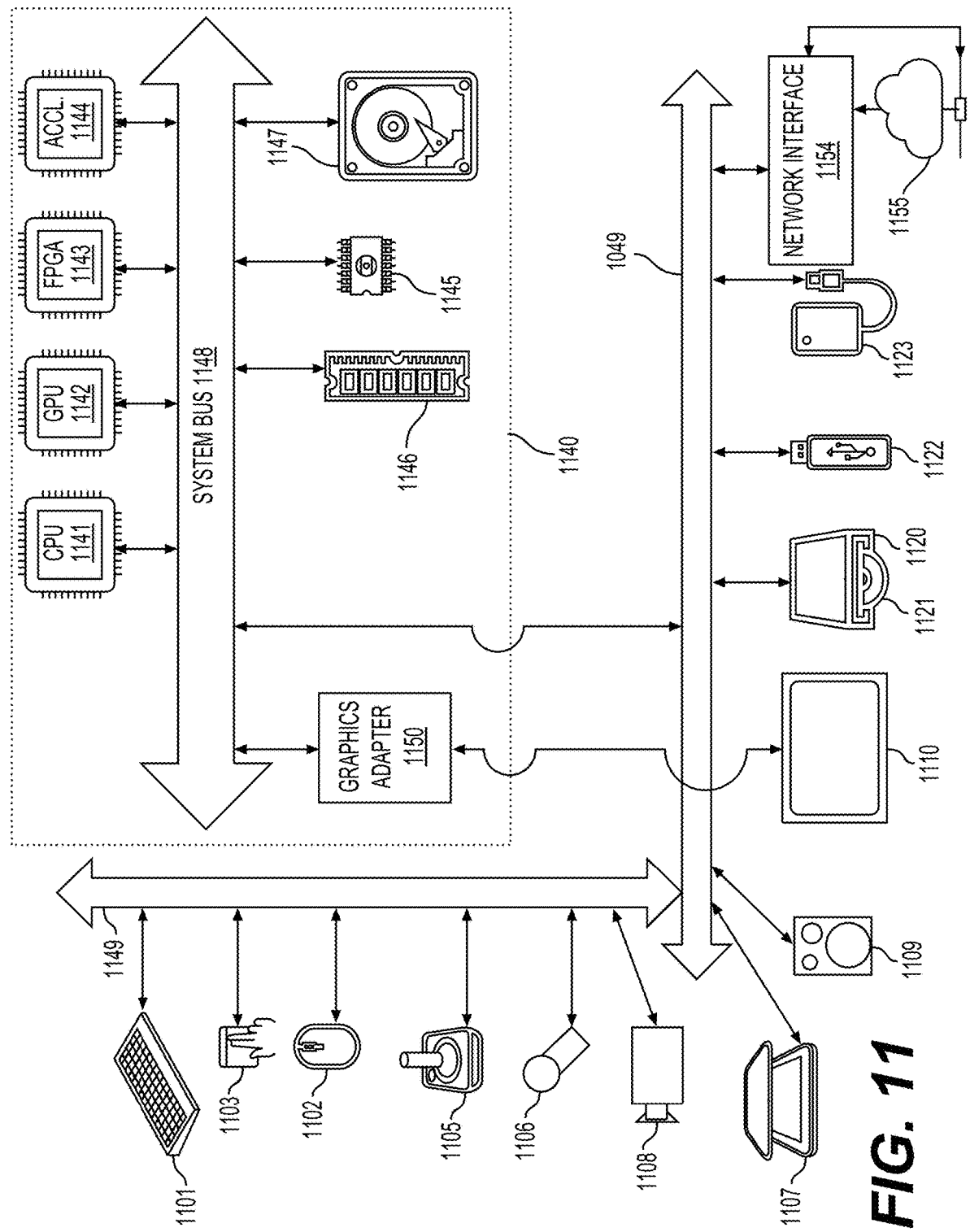
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include an interface (1154) to one or more communication networks (1155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), graphics adapters (1150), and so forth. These devices, along with Read-only memory (ROM) (1145), Random-access memory (1146), internal mass storage such as internal non-user accessible hard drives, SSDs, and the like (1147), may be connected through a system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). In an example, the screen (1110) can be connected to the graphics adapter (1150). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for accessing a Constrained Application Protocol (CoAP) server in a media scene description system, comprising:
   sending, by a media access engine, a CoAP request to the CoAP server to request a media resource, the media access engine comprising a Hypertext Transfer Protocol (HTTP) client and a HTTP-CoAP proxy configured to perform cross-protocol translation from HTTP to CoAP by mapping an HTTP request, which is generated by the HTTP client of the media access engine based on a media request from a presentation engine, to the CoAP request to be sent to the CoAP server; and
   receiving, by the media access engine, a CoAP response from the CoAP server, the CoAP response including the requested media resource.

2. The method of claim 1, further comprising:
   processing the received media resource by one of (i) a video decoder, (ii) an audio decoder, or (iii) a data compressor; and
   rendering the processed media resource by the presentation engine.

3. The method of claim 1, wherein
   the sending the CoAP request and the receiving the CoAP response are performed using an HTTP-CoAP proxy API.

4. The method of claim 3, wherein further comprising:
   the mapping the HTTP request from the HTTP client to the CoAP request is performed using the HTTP-CoAP proxy API.

5. The method of claim 4, further comprising:
   mapping, by the media access engine, the CoAP response from the CoAP server to an HTTP response using the HTTP-CoAP proxy API.

6. An apparatus for accessing a Constrained Application Protocol (CoAP) server in a media scene description system, comprising:
   processing circuitry of a media access engine configured to:
     send a CoAP request to the CoAP server to request a media resource, the media access engine comprising a Hypertext Transfer Protocol (HTTP) client and a HTTP-CoAP proxy configured to perform cross-protocol translation from HTTP to CoAP by mapping an HTTP request, which is generated by the HTTP client of the media access engine based on a media request from a presentation engine, to the CoAP request to be sent to the CoAP server; and
     receive, by the media access engine, a CoAP response from the CoAP server, the CoAP response including the requested media resource.

7. The apparatus of claim 6, wherein the processing circuitry is configured to:
   process the received media resource, and render the processed media resource by the presentation engine.

8. The apparatus of claim 6, wherein
   the processing circuitry of the media access engine is configured to send the CoAP request and receive the CoAP response using an HTTP-CoAP proxy API.

9. The apparatus of claim 8, wherein the processing circuitry is configured to:
   map the HTTP request from the HTTP client to the CoAP request using the HTTP-CoAP proxy API.

10. The apparatus of claim 9, wherein the processing circuitry is configured to:
    map the CoAP response from the CoAP server to an HTTP response using the HTTP-CoAP proxy API.

11. A non-transitory computer-readable medium storing instructions that, when executed by a processor, cause the processor to perform a method for accessing a Constrained Application Protocol (CoAP) server in a media scene description system, the method comprises:
    sending, by a media access engine, a CoAP request to the CoAP server to request a media resource, the media access engine comprising a Hypertext Transfer Protocol (HTTP) client and a HTTP-CoAP proxy configured to perform cross-protocol translation from HTTP to CoAP by mapping an HTTP request, which is generated by the HTTP client of the media access engine based on a media request from a presentation engine, to the CoAP request to be sent to the CoAP server; and receiving, by the media access engine, a CoAP response from the CoAP server, the CoAP response including the requested media resource.

12. The non-transitory computer-readable medium of claim 11, wherein the method further comprises:

processing the received media resource by one of (i) a video decoder, (ii) an audio decoder, or (iii) a data compressor; and rendering the processed media resource by the presentation engine.

13. The non-transitory computer-readable medium of claim 11, wherein the sending the CoAP request and the receiving the CoAP response are performed using an HTTP-CoAP proxy API.

14. The non-transitory computer-readable medium of claim 13, wherein the method further comprises:

the mapping the HTTP request from the HTTP client to the CoAP request is performed using the HTTP-CoAP proxy API.

15. The non-transitory computer-readable medium of claim 14, wherein the method further comprises:

mapping, by the media access engine, the CoAP response from the CoAP server to an HTTP response using the HTTP-CoAP proxy API.

\* \* \* \* \*